US008225972B2

(12) United States Patent
Butkiewicz et al.

(10) Patent No.: US 8,225,972 B2
(45) Date of Patent: Jul. 24, 2012

(54) LUGGAGE RACK AND PASSENGER SEAT FOR A MOTORCYCLE

(75) Inventors: Christopher J. Butkiewicz, Brookfield, WI (US); Kenneth A. Dietzler, Milwaukee, WI (US); Anthony N. Pink, Hartford, WI (US); Steven C. Ausloos, Cedarburg, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 1064 days.

(21) Appl. No.: 12/145,636

(22) Filed: Jun. 25, 2008

(65) Prior Publication Data

US 2009/0001113 A1 Jan. 1, 2009

Related U.S. Application Data

(60) Provisional application No. 60/937,734, filed on Jun. 29, 2007.

(51) Int. Cl.
*B60J 7/04* (2006.01)
*B60J 1/00* (2006.01)
(52) U.S. Cl. ... 224/413; 224/486; 224/42.4; 297/195.13
(58) Field of Classification Search .................. 224/413, 224/431, 275, 484, 486, 42.32–42.4; 297/195.13
See application file for complete search history.

(56) References Cited

U.S. PATENT DOCUMENTS

| 1,004,975 | A | | 10/1911 | Blackman |
| 1,102,899 | A | | 7/1914 | Fox |
| 1,121,580 | A | | 12/1914 | Burkett et al. |
| 2,147,361 | A | | 2/1936 | Bloomberg |
| 4,325,531 | A | * | 4/1982 | Omholt .......................... 248/553 |
| 5,533,783 | A | | 7/1996 | Harms et al. |
| 5,558,260 | A | | 9/1996 | Reichert |
| 5,725,138 | A | * | 3/1998 | Zagrodnik ..................... 224/413 |
| 5,931,360 | A | * | 8/1999 | Reichert ....................... 224/413 |
| 5,997,088 | A | | 12/1999 | Stark et al. |
| 6,354,476 | B1 | * | 3/2002 | Alderman ..................... 224/413 |
| 6,648,408 | B1 | | 11/2003 | Grove |
| 7,147,281 | B2 | | 12/2006 | Michisaka et al. |
| 7,275,787 | B1 | * | 10/2007 | Grove ...................... 297/215.12 |
| 7,775,411 | B2 | * | 8/2010 | Campbell ..................... 224/431 |
| 2008/0073396 | A1 | * | 3/2008 | Chiang et al. ................ 224/413 |

* cited by examiner

*Primary Examiner* — Justin Larson
(74) *Attorney, Agent, or Firm* — Michael Best & Friedrich LLP

(57) ABSTRACT

A luggage rack and passenger seat combination for a motorcycle includes a luggage rack assembly configured to mount to the motorcycle. The luggage rack assembly has a support member operable to support cargo on a support surface thereof, the luggage rack assembly including a first engaging feature and a second engaging feature. A passenger seat assembly includes a movable mounting member and a fixed mounting member. The movable mounting member is movable between an unlocked position and a locked position. The movable mounting member is engageable with the first engaging feature and the fixed mounting member is engageable with the second engaging feature to removably couple the passenger seat assembly to the luggage rack assembly to support a passenger of the motorcycle.

19 Claims, 19 Drawing Sheets

LUGGAGE RACK AND PASSENGER SEAT FOR A MOTORCYCLE

CROSS-REFERENCE TO RELATED APPLICATIONS

This application claims priority to U.S. Patent Application Ser. No. 60/937,734, filed on Jun. 29, 2007, the entire contents of which are hereby incorporated by reference.

BACKGROUND

The present invention relates to luggage racks and passenger or "pillion" seats for motorcycles. More particularly, the invention relates to a luggage rack assembly selectively configurable to function as a luggage rack and as a support for a passenger seat assembly.

SUMMARY

In one embodiment, the invention provides a luggage rack and passenger seat combination for a motorcycle. The combination includes a luggage rack assembly configured to mount to the motorcycle. The luggage rack assembly has a support member operable to support cargo on a support surface thereof, the luggage rack assembly including a first engaging feature and a second engaging feature. A passenger seat assembly includes a movable mounting member and a fixed mounting member. The movable mounting member is movable between an unlocked position and a locked position. The movable mounting member is engageable with the first engaging feature and the fixed mounting member is engageable with the second engaging feature to removably couple the passenger seat assembly to the luggage rack assembly to support a passenger of the motorcycle.

In another embodiment, the support member includes an engaging feature. The passenger seat assembly includes a bottom surface configured to face the support member when the passenger seat assembly is coupled to the luggage rack assembly. A movable mounting member extends from the bottom surface of the passenger seat assembly and is rotatable about an axis substantially perpendicular thereto between an unlocked position and a locked position. The movable mounting member is engageable with the engaging feature and restrains the passenger seat assembly from moving relative to the luggage rack assembly when in the locked position.

In yet another embodiment, the invention provides a method of securing a passenger seat assembly having a movable mounting member to a support member of a luggage rack assembly on a motorcycle. The method includes inserting the movable mounting member in an unlocked position into an opening in the support member, and rotating the movable mounting member from the unlocked position to a locked position, in which the movable mounting member is restrained against the support member to secure the passenger seat assembly to the luggage rack assembly.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
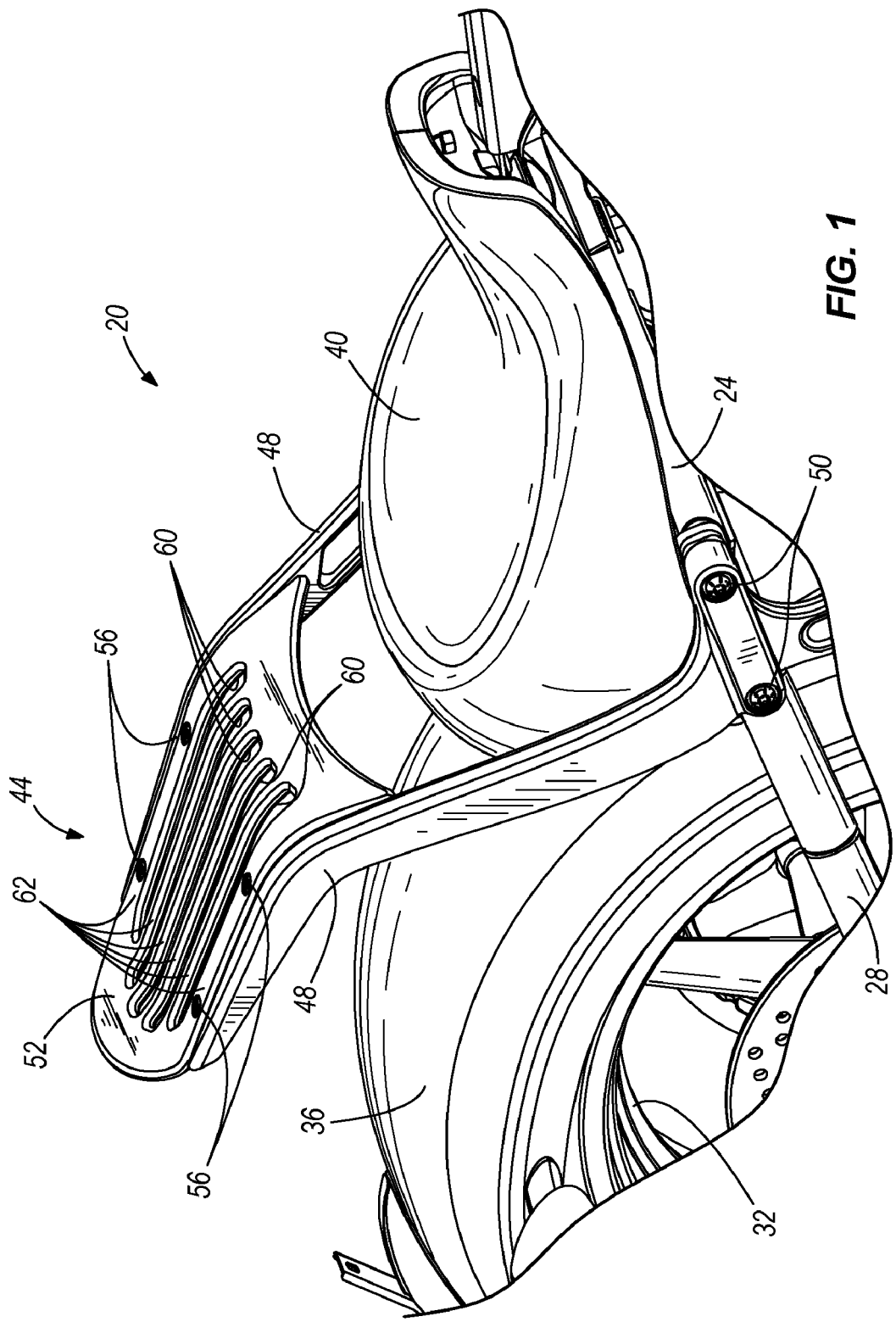
FIG. 1 is a perspective view of a portion of a motorcycle configured with a luggage rack assembly.

With reference to FIG. 1, a motorcycle 20 includes a frame 24 to which a swingarm 28 is coupled to support a rear wheel 32 of the motorcycle 20. A fender 36 is coupled to the swingarm 28 to at least partially surround the rear wheel 32. A seat 40 is coupled to the frame 24 to support a motorcycle rider (not shown) in a position to operate the motorcycle 20.

Figure 3:
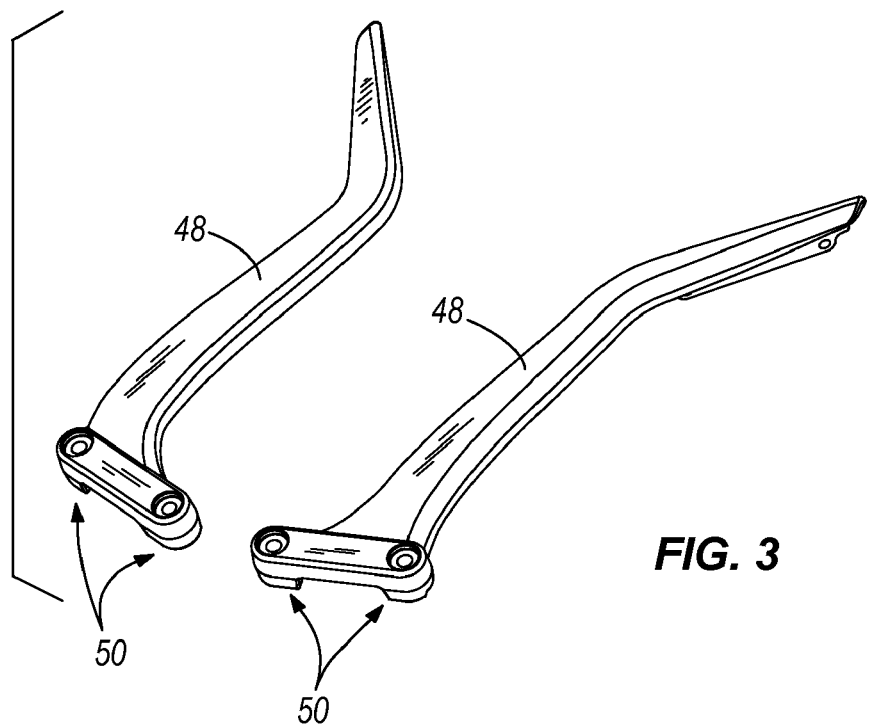
FIG. 3 is a perspective view of a pair of support members shown in FIGS. 1 and 2.
Figure 4:
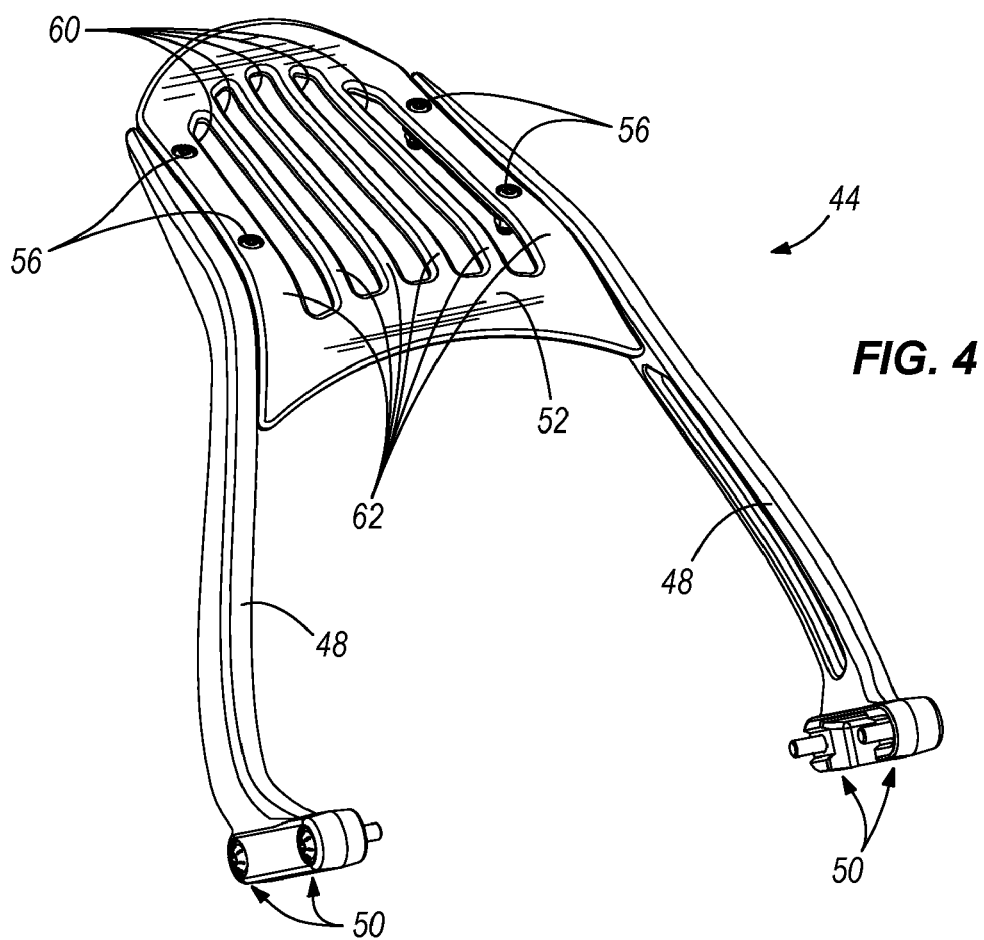
FIG. 4 is a perspective view of the luggage rack assembly of FIG. 1.
Figure 13:
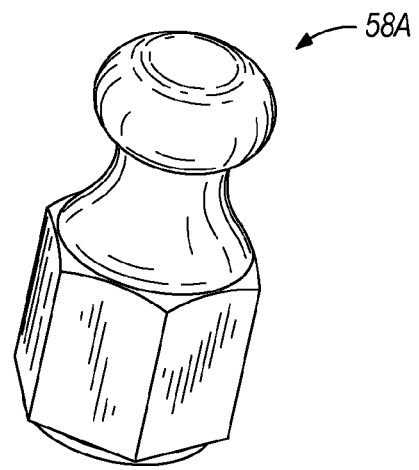
FIG. 13 is a perspective view of an alternate nut for use with the luggage rack assembly of FIG. 1.
Figure 14:
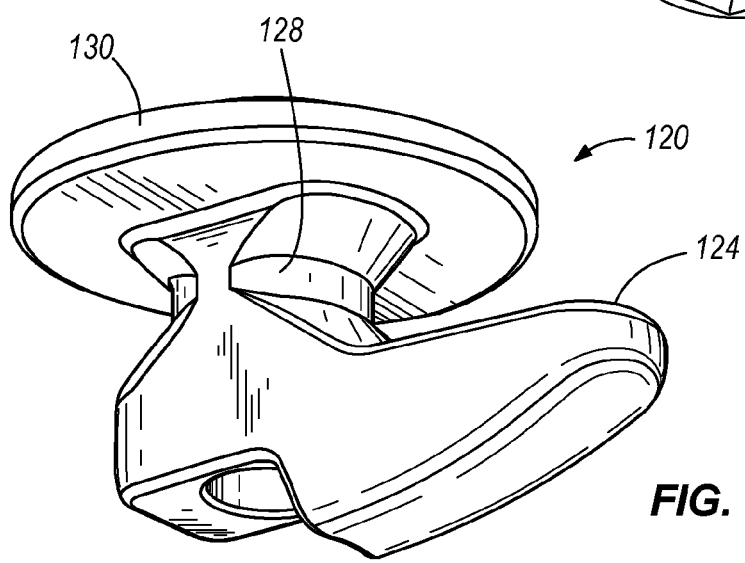
FIGS. 14 and 15 are perspective views of a clasp of the passenger seat assembly of FIG. 2.
Figure 15:
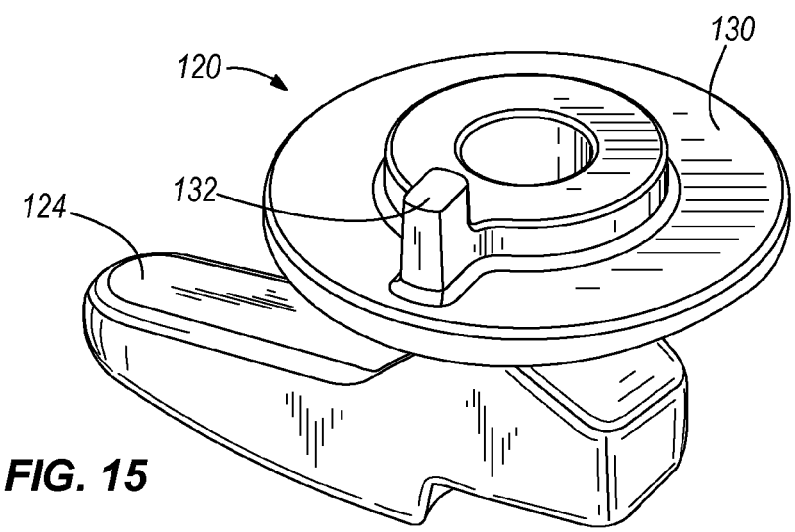
Figure 16:
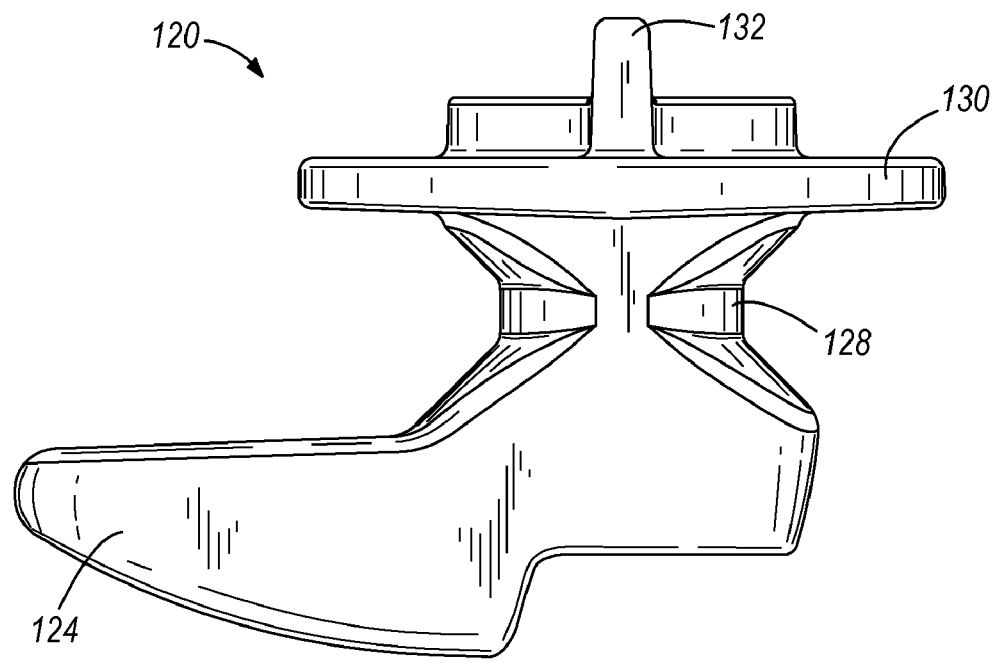
FIG. 16 is a side view of the clasp of FIGS. 14 and 15.
Figure 17:
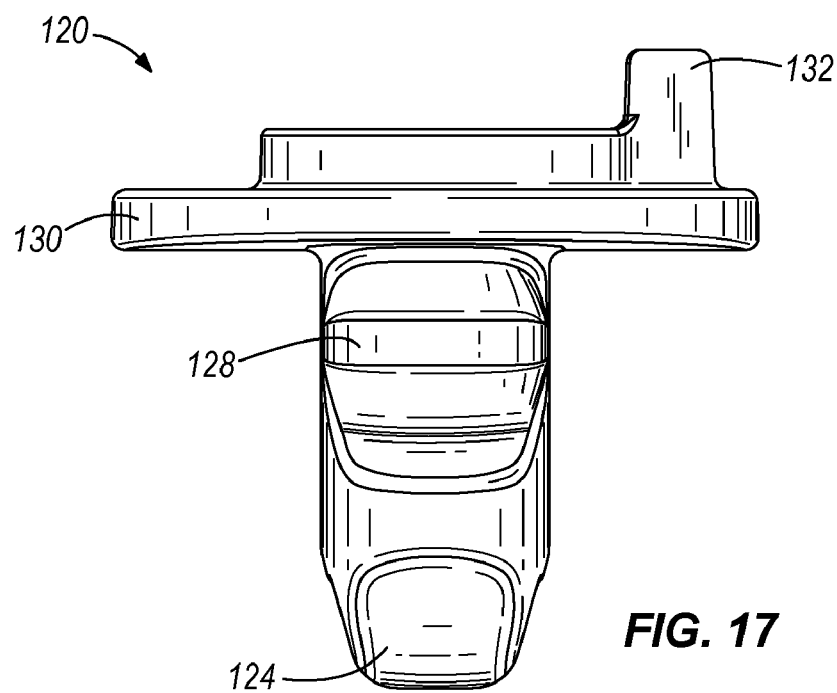
FIG. 17 is a front view of the clasp of FIGS. 14 and 15.

As shown in FIG. 1, the motorcycle 20 includes a luggage rack assembly 44 coupled to the frame 24. The luggage rack assembly 44 includes a pair of mounting members 48 (FIG. 3), each of which includes a pair of mounting locations 50 for attaching to the frame 24 (e.g., with threaded fasteners). The luggage rack assembly 44 further includes a support member 52 (FIG. 1) configured to support one or more cargo items on the motorcycle 20. The support member 52 is coupled to each of the mounting members 48 with a pair of fasteners 56 (e.g., threaded fasteners), as shown in at least FIGS. 1 and 4. A nut 58 (FIGS. 7-10) is used to tighten each of the fasteners 56 on the underside of the support member 52. As shown in FIG. 13, an alternate nut 58A can be used in place of one or more of the nuts 58 shown in FIGS. 7-10. Each alternate nut 58A is formed with a hex portion, a neck portion, and a head portion. The alternate nuts 58A are configured not only to engage the fasteners 56 to mount the support member 52, but also to provide attachment locations on the luggage rack assembly 44 configured to receive cargo-retaining elements (e.g., elastic "bungee" straps with hooked ends). The neck portions of the alternate nuts 58A provide receiving areas to hold the hooked ends of the bungee straps from sliding off the alternate nuts 58A.

The mounting members 48 are contoured to position the support member 52 above the fender 36 and behind the seat 40. The support member 52 is provided with five slots 60 extending through the support member 52. The slots 60 extend in a common direction (along spaced-apart, substantially parallel axes) longitudinally with respect to the motorcycle 20. In some embodiments, the support member 52 includes one, two, three, four, six, or more slots 60. In some embodiments, the support member 52 includes openings of a different shape and/or orientation. At least one engaging feature of a first type (e.g., in the form of a rib 62) is defined adjacent each of the slots 60. The support member 52 further includes a second receiving feature of a second type in the form of a pair of indentations 64 (FIG. 9) in an underside of the support member 52. The function of the ribs 62 and the indentations 64 is described in further detail below.

Figure 2:
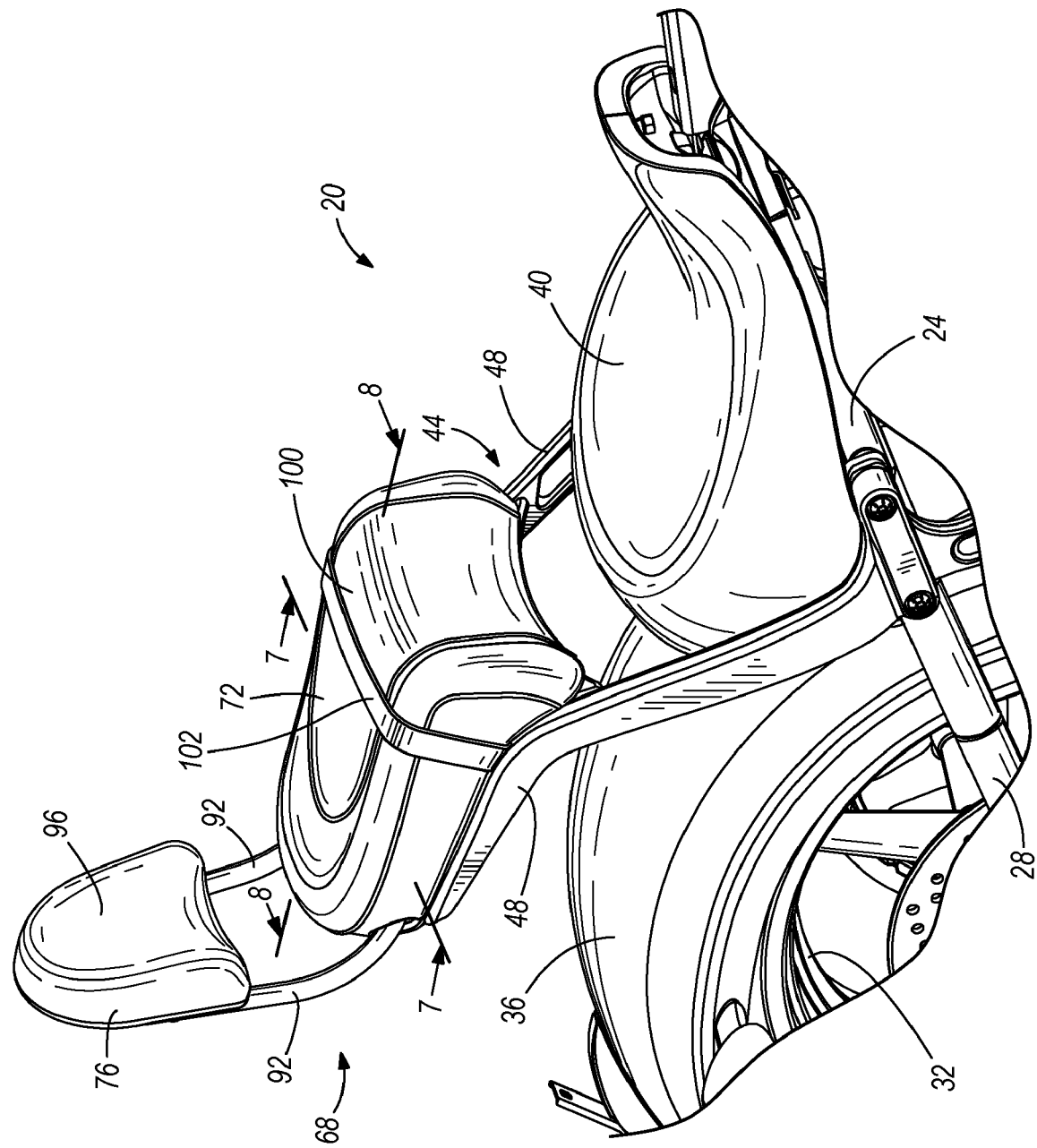
FIG. 2 is a perspective view of a portion of the motorcycle of FIG. 1 configured with a passenger seat assembly.
Figure 5:
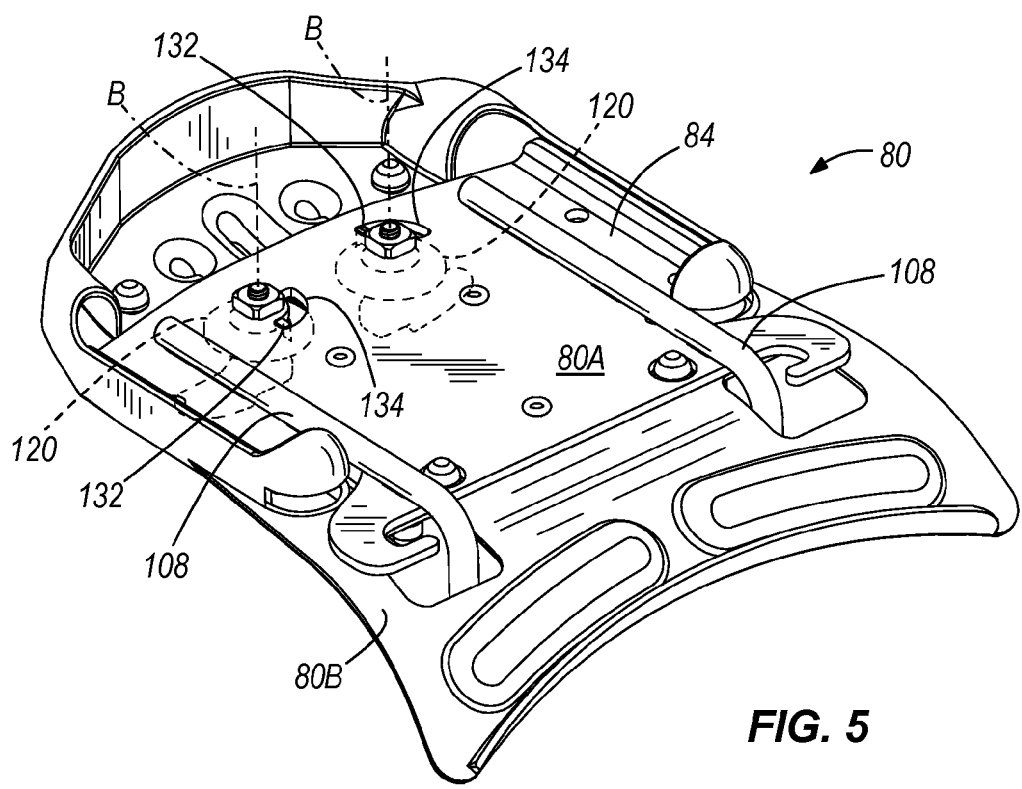
FIG. 5 is a top perspective view of a seat pan assembly of the passenger seat assembly of FIG. 2.
Figure 6:
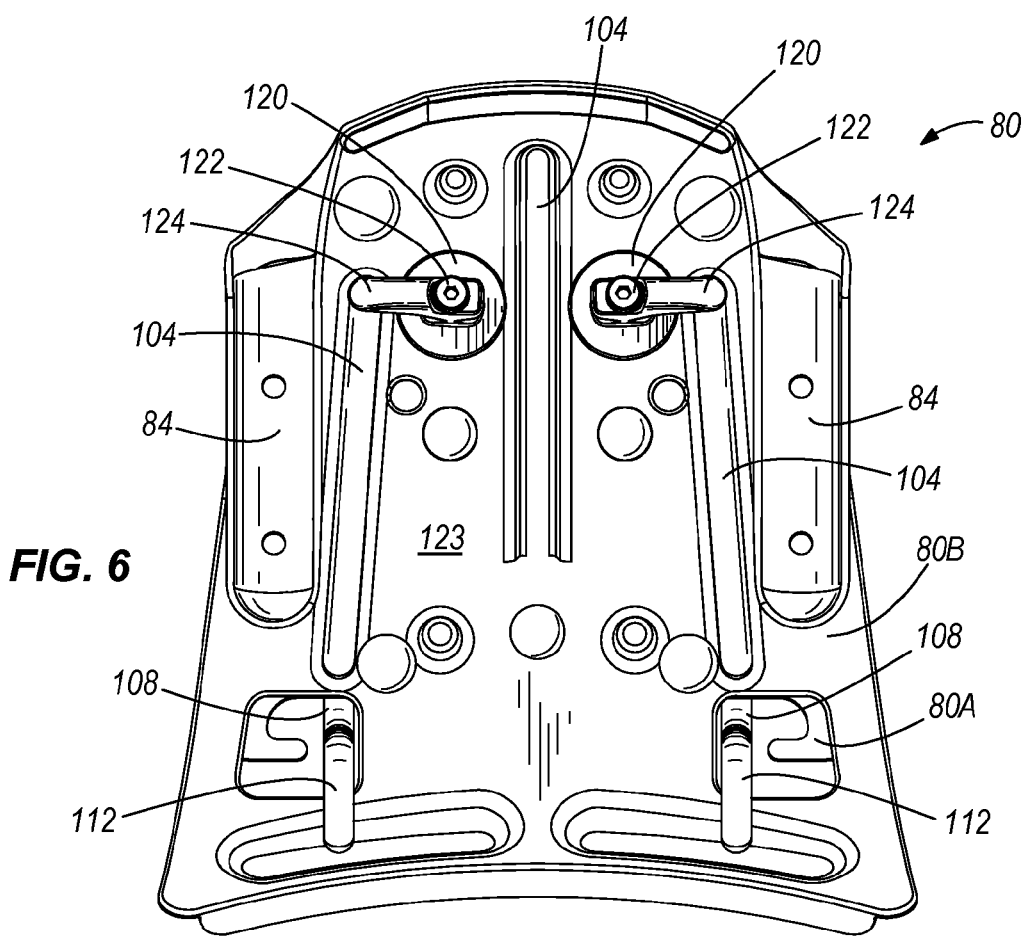
FIG. 6 is bottom view of the seat pan assembly of FIG. 5.

FIG. 2 illustrates a passenger seat assembly 68 including a lower portion 72 and an upper portion 76. The lower portion 72 may provide a seating surface for supporting a passenger (not shown) behind a seated operator of the motorcycle 20. Both the lower portion 72 and the upper portion 76 are cushioned for comfort. The passenger seat assembly 68 is coupled to the motorcycle 20 by attachment directly to the luggage rack assembly 44, as described in further detail below. The lower portion 72 of the passenger seat assembly 68 includes a seat pan assembly 80 (FIGS. 5 and 6). The seat pan assembly 80 includes a first member 80A such as a plate or stamping and a second member 80B such as formed plastic member that is coupled to the first member 80A. The seat pan assembly 80 includes a pair of connection portions 84 configured to receive fasteners 88 to mount the upper portion 76 by two legs 92 (see FIG. 2). A cushion 96 is coupled to the legs 92 of the upper portion 76 to provide comfortable back support to the passenger. A cushion 100 is coupled to the seat pan assembly 80 of the lower portion 72 to provide a comfortable seating surface for the passenger of the motorcycle 20. The cushion 100 is removed from the cross-sectional views of FIGS. 7-10 for clarity to illustrate various features of the mounted passenger seat assembly 68. As shown in FIGS. 2 and 11, a handle or strap 102 is provided on the cushion 100. The strap 102 is coupled to the seat pan assembly 80 and may be grasped during attachment and/or detachment of the passenger seat assembly 68 and luggage rack assembly 44.

Figure 7:
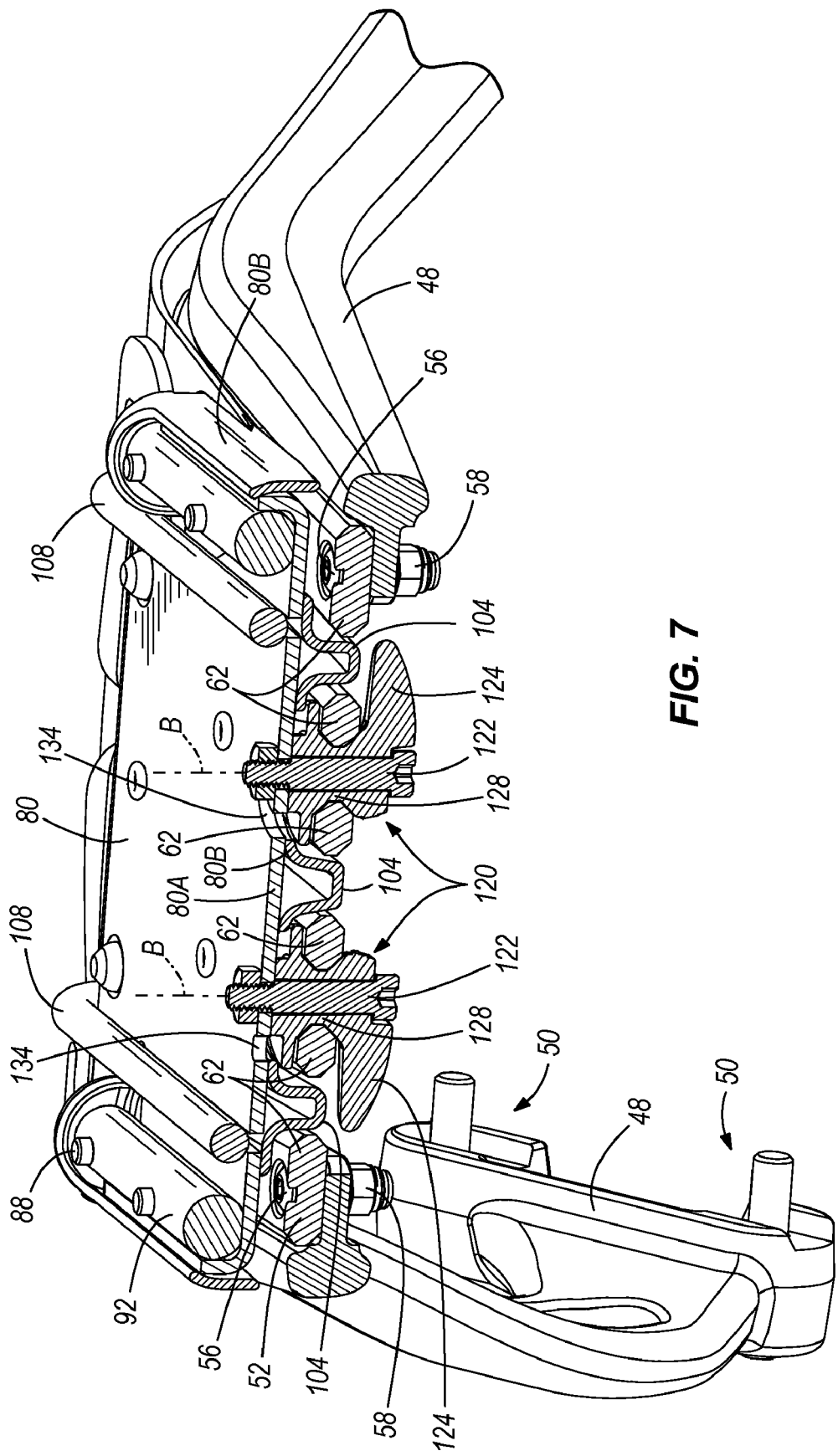
FIG. 7 is a cross-section view of the mounted passenger seat assembly taken through a pair of clasps of the seat pan assembly, at 7-7 in FIG. 2.
Figure 8:
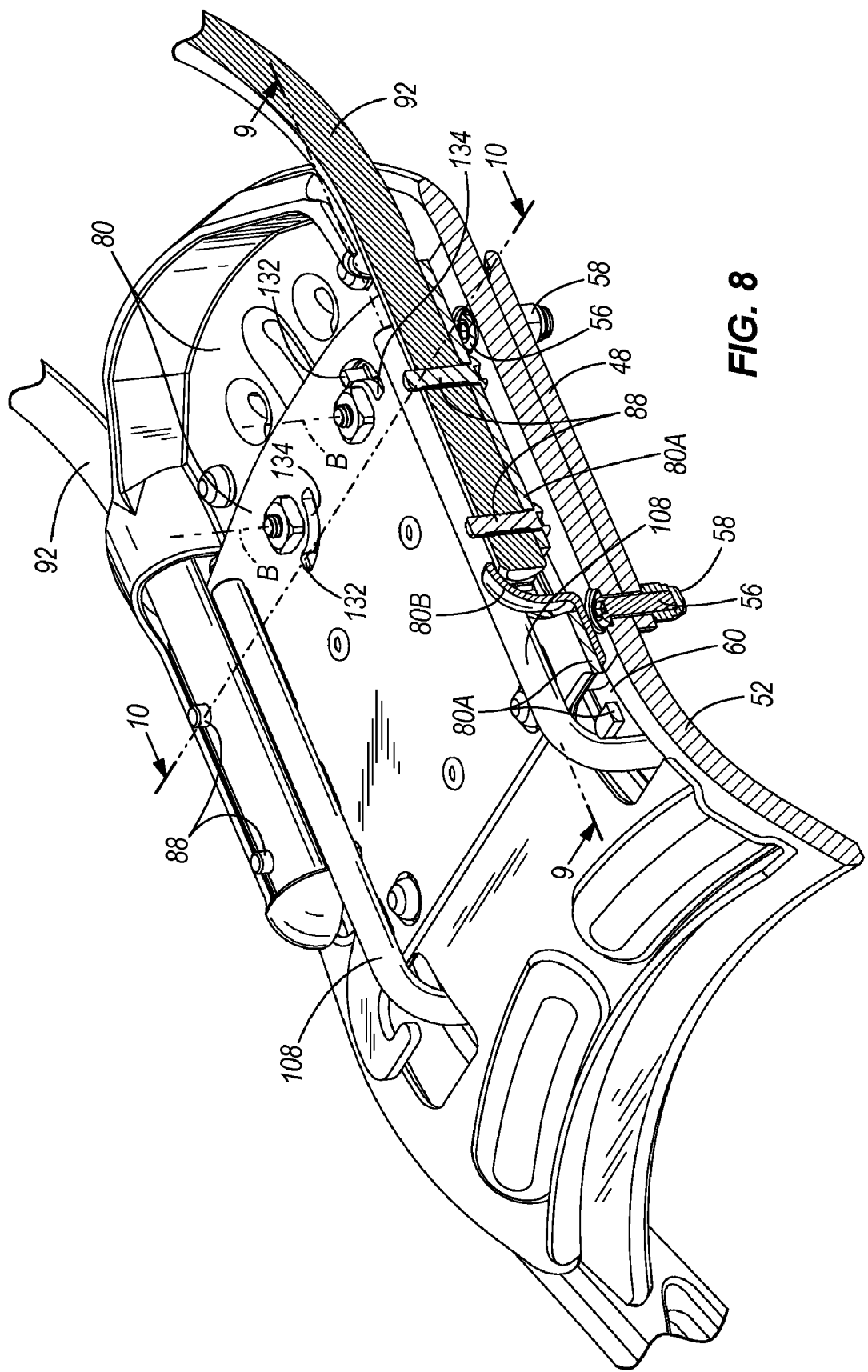
FIG. 8 is a cross-section view of the mounted passenger seat assembly taken through a leg of a backrest portion, at 8-8 in FIG. 2.
Figure 9:
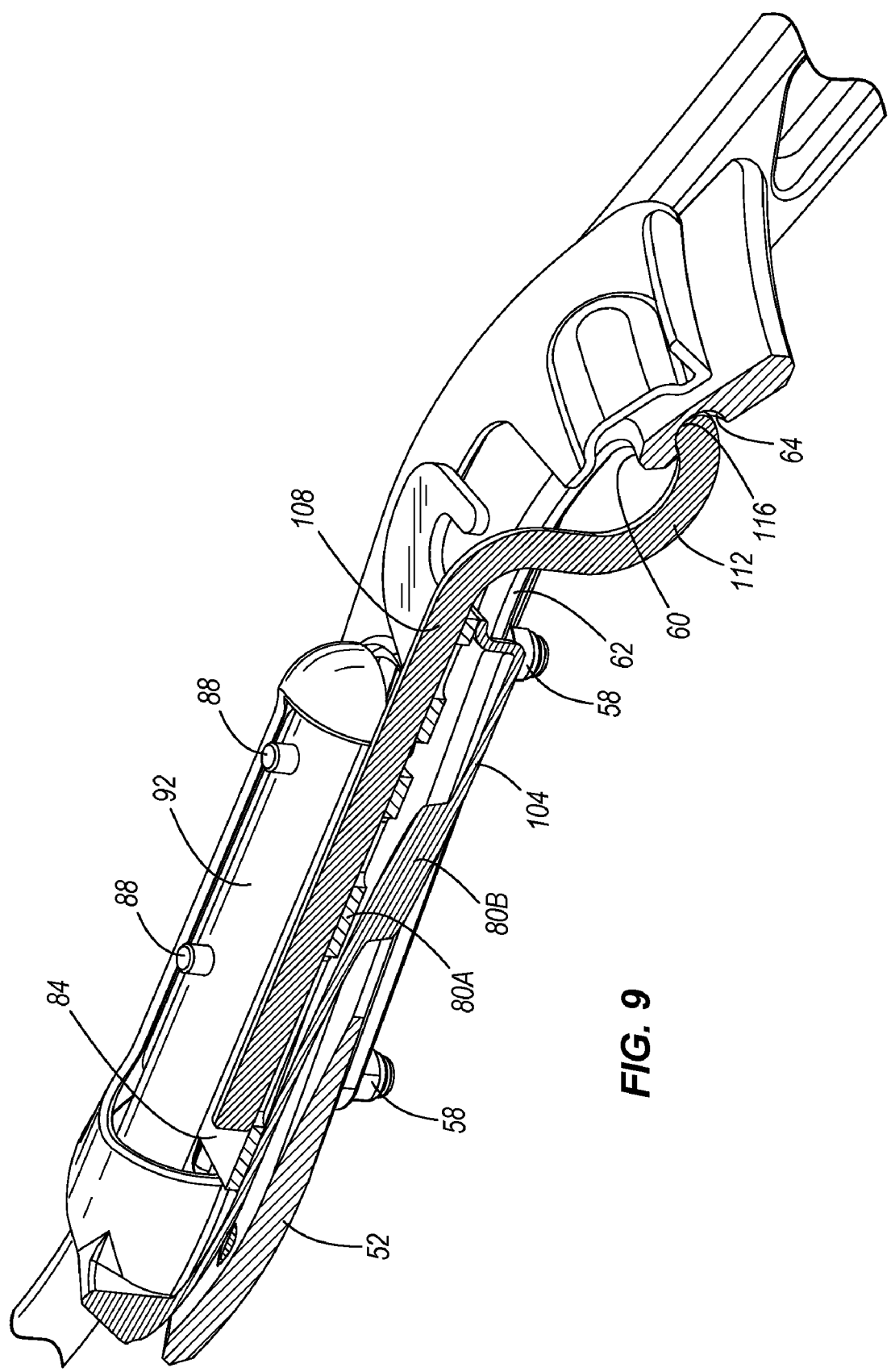
FIG. 9 is a cross-section view of the mounted passenger seat assembly taken through an attachment rod of the seat pan assembly, at 9-9 in FIG. 8.
Figure 10:
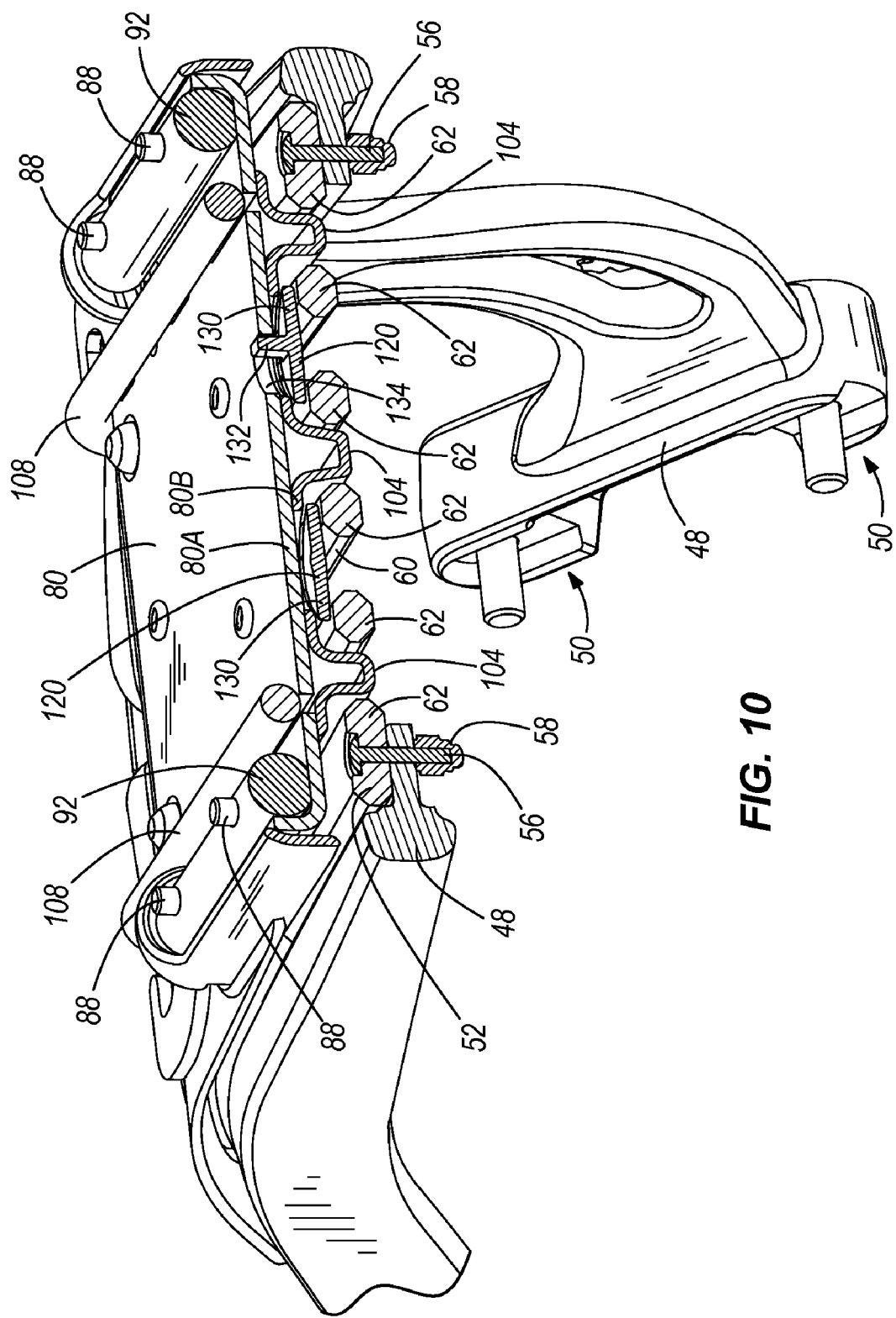
FIG. 10 is a cross-section view of the mounted passenger seat assembly taken through a rearward pair of fasteners that mount a support member of the luggage rack assembly to the mounting members of FIG. 3, taken at 10-10 in FIG. 8.
Figure 11:
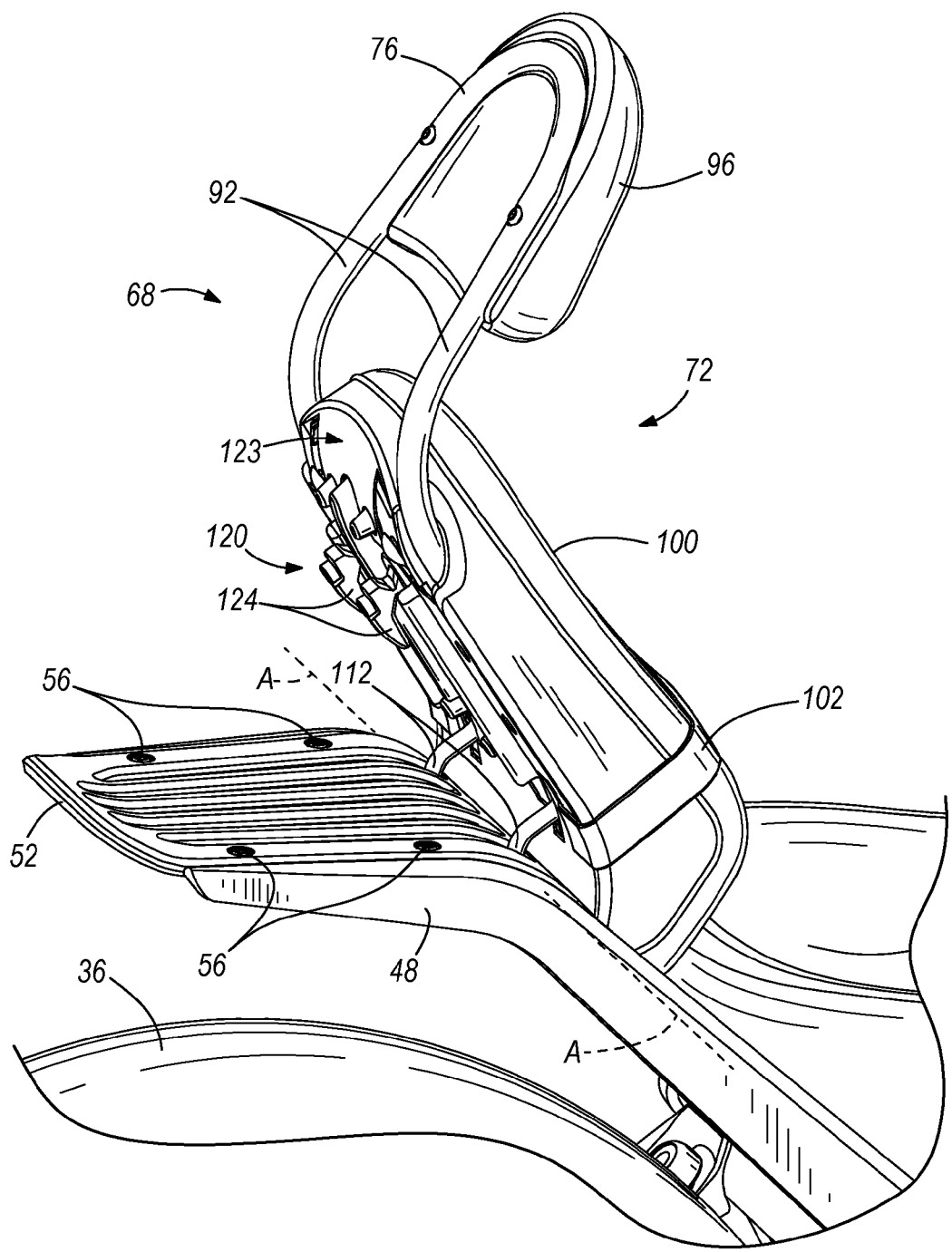
FIG. 11 is a perspective view of the passenger seat assembly of FIG. 2 being assembled with and/or removed from the luggage rack assembly of FIG. 1.

As shown in FIGS. 7, 9, and 10, the seat pan assembly 80 includes a plurality of contours 104 that are shaped to conform to and fit within the slots 60 in the support member 52. Specifically, three contours 104 of the seat pan assembly 80 are configured to engage the middle, far left, and far right slots 60. The seat pan assembly 80 further includes mounting members in the form of a pair of attachment rods 108 configured to engage the indentations 64 on the underside of the support member 52. The attachment rods 108 are substantially fixed relative to the seat pan assembly 80, and each attachment rod 108 includes a hooked end 112 with a tip 116 that is received in the respective indentation 64 (FIG. 9). Engagement of the attachment rods 108 with the support member 52 fixes the seat pan assembly 80 against lateral and fore/aft movement with respect to the support member 52. With the tips 116 of the attachment rods 108 engaged with the indentations 64 in the support member 52, the passenger seat assembly 68 has one degree of freedom in movement relative to the support member 52. The engagement of the tips 116 in the indentations 64 does not preclude rotation of the passenger seat assembly 68 about an axis A-A (FIG. 11), which passes through both indentations 64. In some embodiments, the seat pan assembly 80 and support member 52 are provided with alternate inter-engaging attachment structure.

The seat pan assembly 80 further includes movable mounting members in the form of a pair of clasps 120 (FIGS. 5-7, 10, 11, 14-17), each of which is configured to rotate approximately one quarter-turn (about 90 degrees) between an unlocked position (FIG. 11) and a locked position (FIGS. 5-7). The clasps 120 are mounted with fasteners 122 and configured to rotate relative to the fasteners 122 and the rest of the seat pan assembly 80 about axes B that are coaxial with the respective fasteners 122. The axes B are substantially perpendicular with a bottom surface 123 (FIG. 6) of the passenger seat assembly 68 (which, in the illustrated embodiment, is the bottom of the seat pan assembly 80 or the bottom of the second member 80B of the seat pan assembly 80). The clasps 120 each include a tab portion 124, a necked portion 128, and a flange portion 130. In the unlocked positions, at least the tab portion 124 and the necked portion 128 of each of the clasps 120 are configured to pass through the two slots 60 immediately adjacent the center slot 60. As shown in FIG. 7, the necked portions 128 are configured to engage the ribs 62 of the support member 52 adjacent the respective slots 60. The flange portions 130 rest between a lower surface of the second member 80B of the seat pan assembly 80 and an upper surface of the support member 52. With the clasps 120 in the unlocked positions, the passenger seat assembly 68 is movable relative to the support member 52. When the tips 116 of the attachment rods 108 are engaged with the indentations 64 in the support member 52 with the clasps 120 in the unlocked positions, the movement of the passenger seat assembly 68 relative to the support member 52 is generally limited to rotation about the axis A-A.

With the tips 116 of the attachment rods 108 engaged with the indentations 64 in the support member 52 and the clasps 120 in the unlocked positions, the passenger seat assembly 68 is positioned relative to the support member 52 so that the tab portions 124 of the clasps 120 are parallel to the slots 60 and pass through the respective slots 60 to the underside of the support member 52. The necked portions 128 are aligned or substantially planar with the respective slots 60. From the unlocked position, each clasp 120 is rotated approximately one quarter-turn (about 90 degrees) to the locked position, moving the tab portion 124 generally perpendicular to the direction of extension of the slots 60. The passenger seat assembly 68 is retained by the clasps 120 when the clasps 120 are in the locked positions. In at least the locked positions, the necked portions 128 and the portions directly adjacent thereto are substantially form-fitting with the sides of the respective ribs 62 that define the slots 60 in which the clasps 120 are positioned. In the locked positions, the clasps 120 prevent substantial movement of the passenger seat assembly 68 with respect to the support member 52 in a direction substantially perpendicular to the support member 52 (i.e., substantially vertical). The clasps 120 also prevent substantial rotational movement of the passenger seat assembly 68 with respect to the support member 52 about the axis A-A. Therefore, the clasps 120 are used to securely fasten the passenger seat assembly 68 to the luggage rack assembly 44 so that the motorcycle 20 can support a passenger in addition to the rider operating the motorcycle 20.

In some embodiments, the necked portions 128 of the clasps 120 include a contoured engagement surface operable to selectively engage the support member 52 during rotation between the locked and unlocked positions. For example, clearance can be provided between the necked portion 128 and the support member 52 in one or both of the locked and unlocked positions, while the necked portion 128 has an interference fit with the support member 52 over a range of rotational angles between the locked and unlocked positions. The necked portion 128 can be provided with multiple surface radii and/or flat portions to facilitate the desired interaction with the support member 52. The necked portion 128 can have an interference fit with the support member 52 through a rotation of between about 60 degrees and about 80 degrees, for example. The interference fit provides a tactile feedback to the user and positive positioning of the clasps 120 in either the locked or unlocked position. Thus, the clasps 120 are not easily moved from the locked positions to the unlocked positions, for example, by vibration or incidental contact.

Furthermore, each clasp 120 includes a positioning tab 132 extending upwards substantially parallel with the axes of rotation (i.e., the axes of the respective fasteners 122). The positioning tabs 132 are positioned within arcuate slots 134 in the seat pan assembly 80 (specifically, the first member 80A in the illustrated embodiment of FIG. 5). Each slot 134 extends through an arc of approximately 90 degrees to limit the movement of the clasps 120 between the locked and unlocked positions and provide tactile feedback to the user once the clasp 120 has reached the limit of travel in either direction.

When it is desired to use the luggage rack assembly 44 or remove the passenger seat assembly 68 for any other reason, the process is reversed. The clasps 120 are rotated approximately 90 degrees from the locked positions to the unlocked positions, and the passenger seat assembly 68 is rotated generally upwardly so that the clasps 120 exit the respective slots 60. Then, the attachment rods 108 are removed from engagement with the indentations 64 in order to disengage the passenger seat assembly 68 from the support member 52. FIG. 11 illustrates the passenger seat assembly 68 during assembly with and/or removal from the luggage rack assembly 44 as the passenger seat assembly 68 is rotated about the axis A-A.

Figure 12:
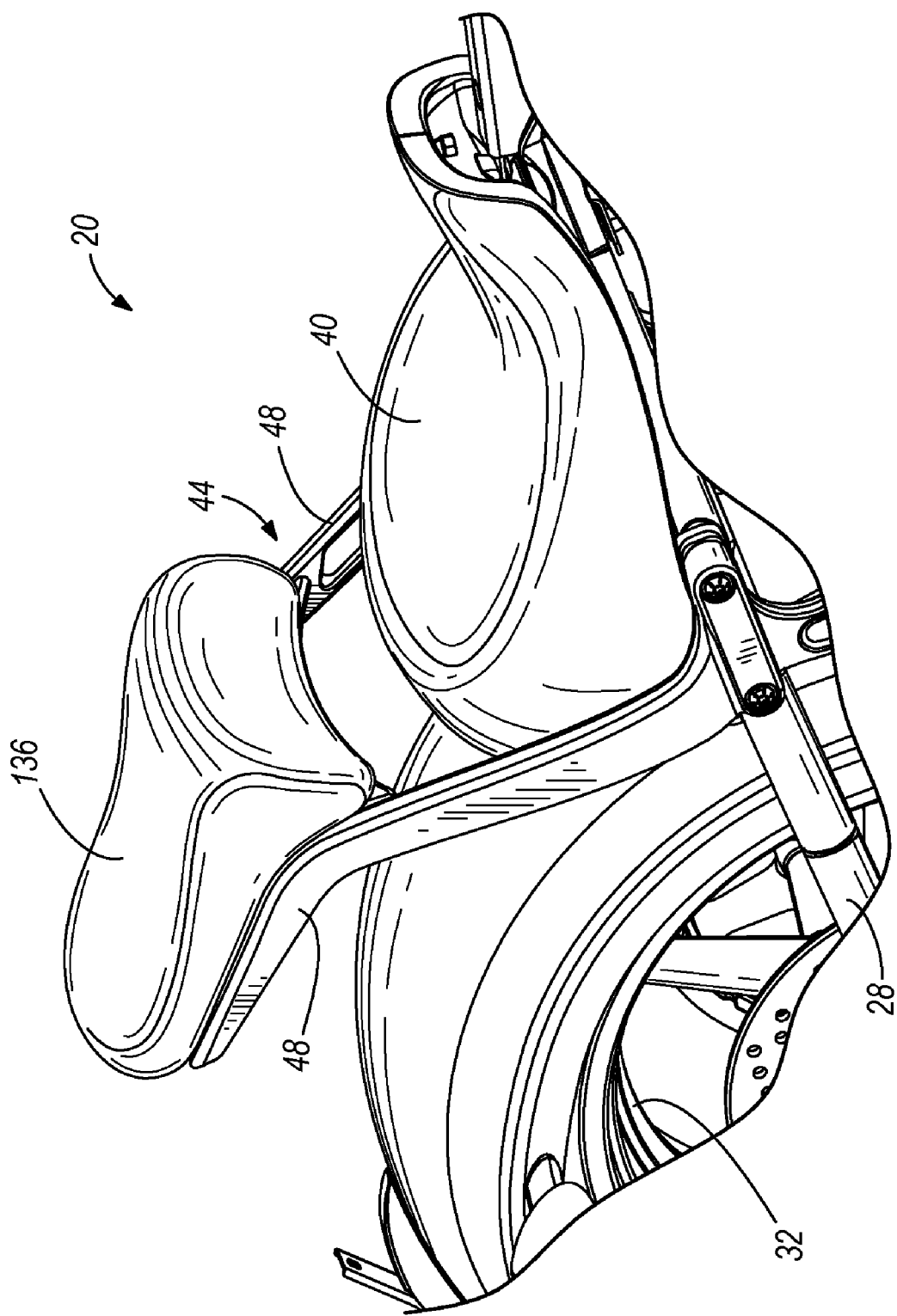
FIG. 12 is a perspective view of the motorcycle of FIGS. 1 and 2 configured with an alternate passenger seat assembly having no backrest portion.

FIG. 12 illustrates an alternate passenger seat assembly 136 coupled to the luggage rack assembly 44. The passenger seat assembly 136 of FIG. 12 is configured to provide a seating surface for a passenger of the motorcycle 20. Aside from the lack of a passenger backrest portion, the passenger seat assembly 136 is generally similar in all material respects to the passenger seat assembly 68 illustrated in FIG. 2 and is selectively engageable with the luggage rack assembly in the same manner.

Figure 18:
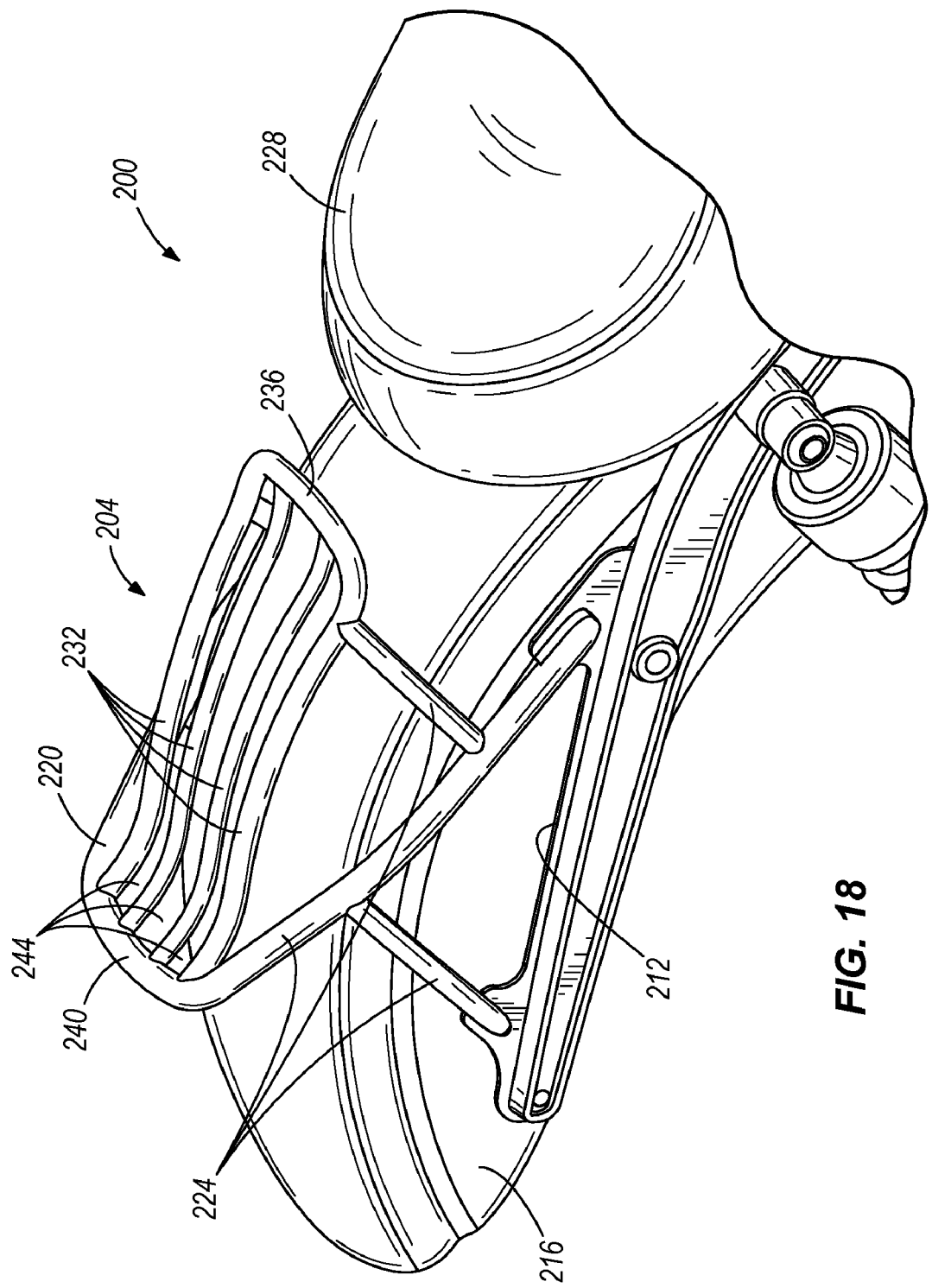
FIG. 18 is perspective view of a portion of a motorcycle configured with a luggage rack assembly.
Figure 19:
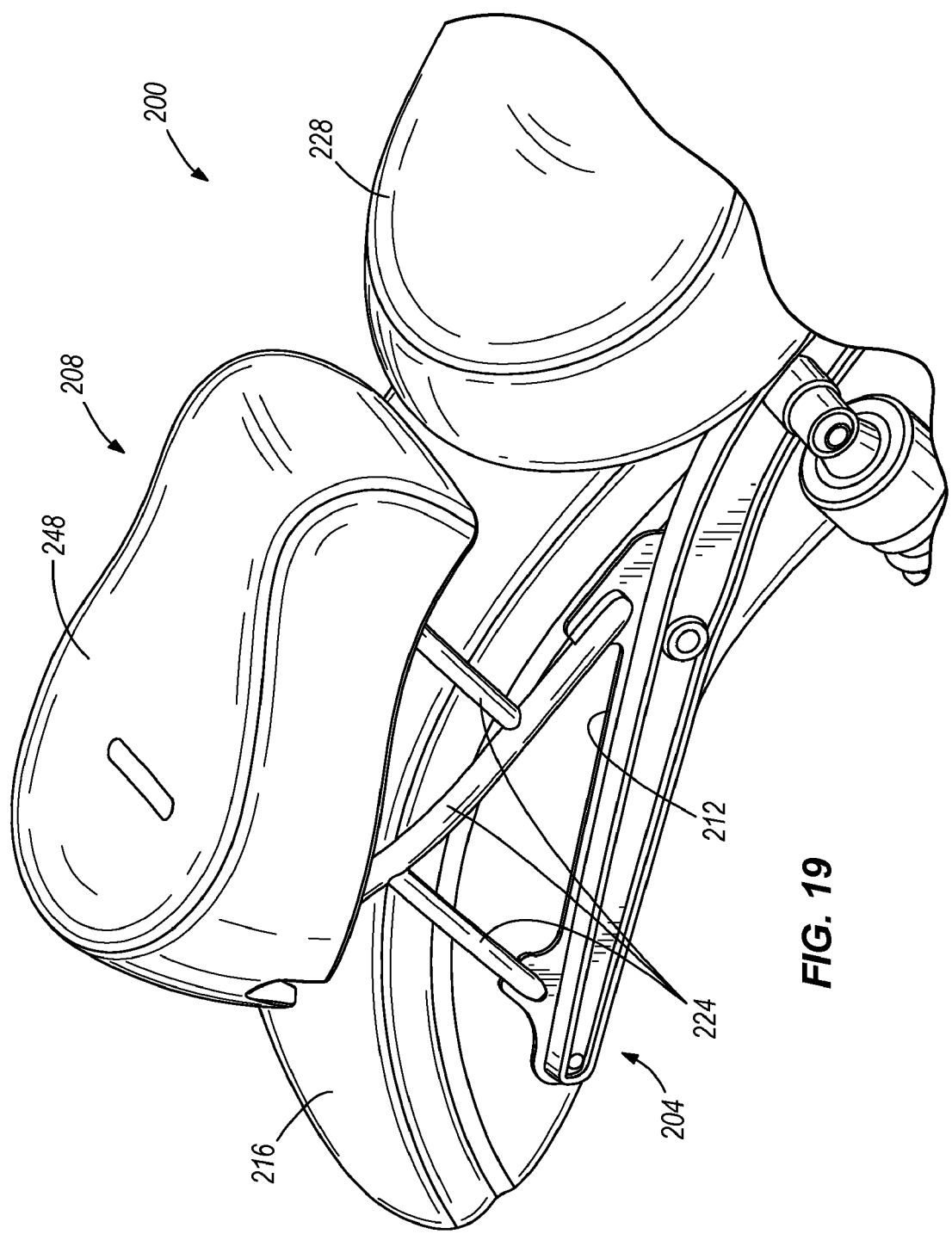
FIG. 19 is a perspective view of the portion of the motorcycle of FIG. 18 configured with a passenger seat assembly.
Figure 20:
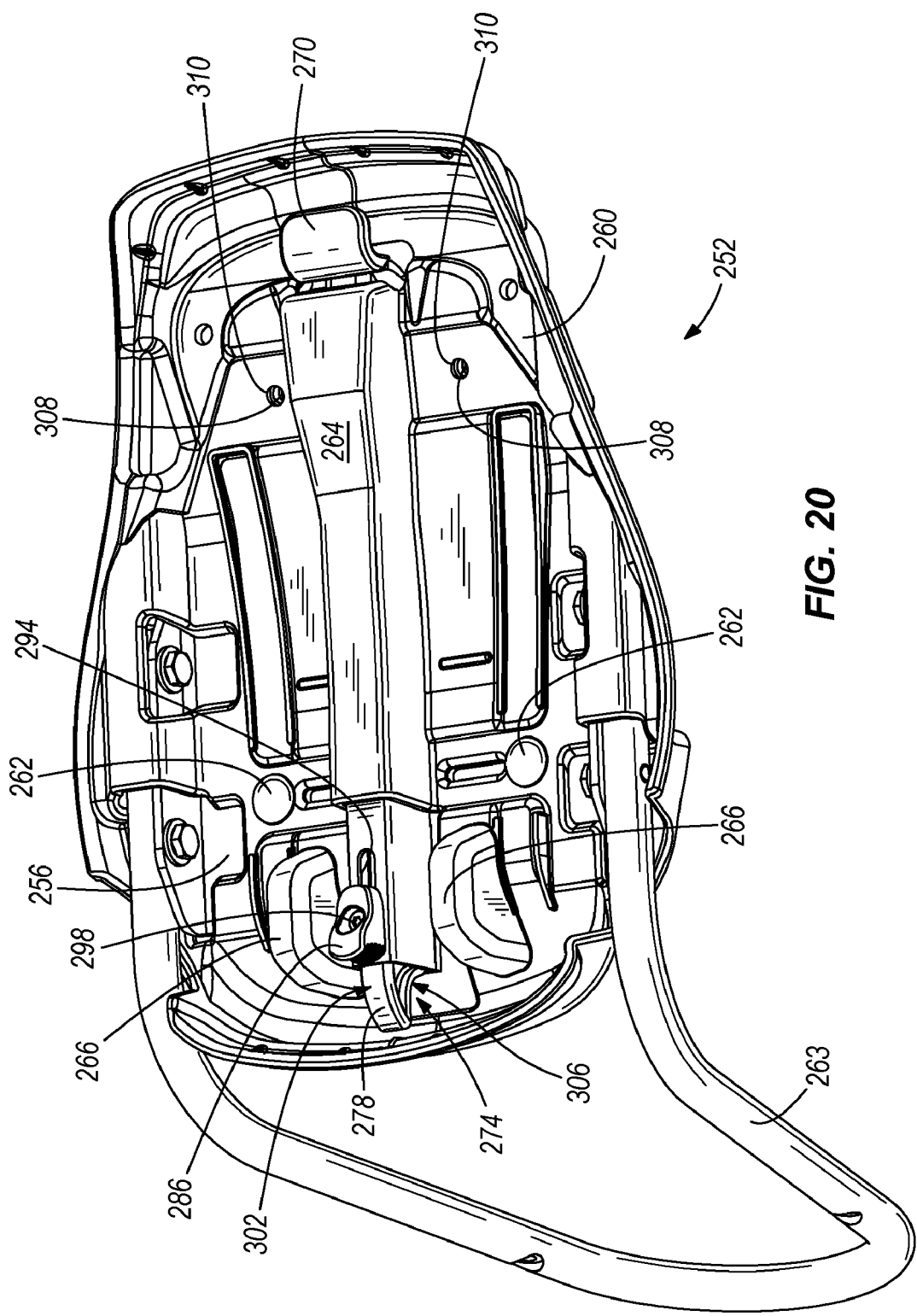
FIG. 20 is a bottom perspective view of a seat pan assembly and optional backrest portion of the passenger seat assembly of FIG. 19.

FIGS. 18 and 19 illustrate a portion of a motorcycle 200, including an alternate luggage rack assembly 204 and passenger seat assembly 208. The luggage rack assembly 204 includes a pair of mounting members 212, which flank a rear fender 216 of the motorcycle 200. The mounting members 212 are coupled to the motorcycle frame (not shown) to support the weight of the luggage rack assembly 204 and items placed thereon. The luggage rack assembly 204 further includes a support member 220 configured to support one or more cargo items on the motorcycle 200. The support member 220 is coupled to the mounting members 212 with a plurality of intermediate members 224. In the illustrated embodiment, the support member 220 and the intermediate members 224 are constructed of round cross-section components as an integral weldment, without threaded fasteners or the like. The support member 220 is positioned by the mounting members 212 above the rear fender 216 and behind a primary rider's seat 228.

Figure 23:
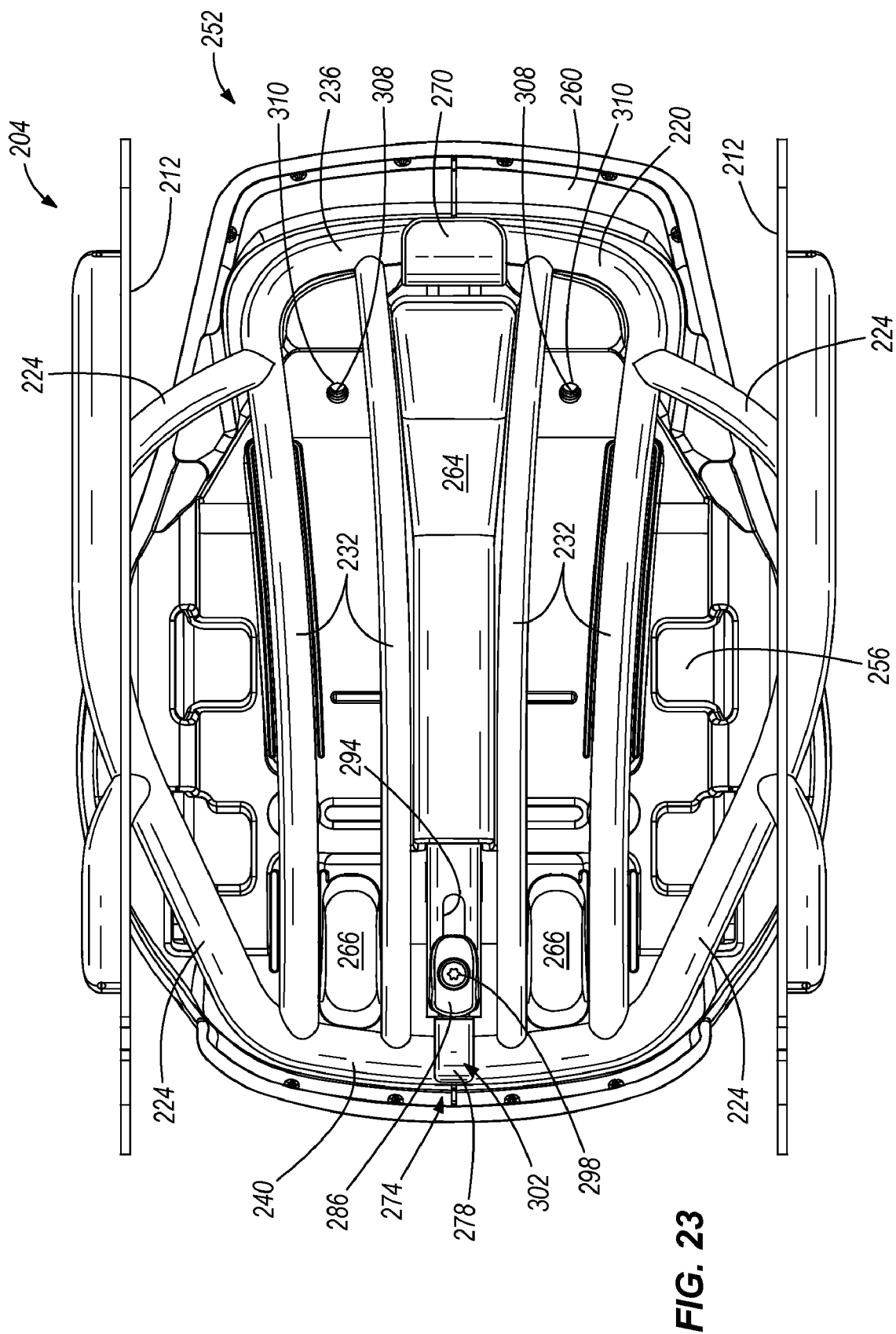
FIG. 23 is a bottom view of the passenger seat assembly mounted to the luggage rack assembly as shown in FIG. 19.

In the illustrated embodiment, the support member 220 includes various engaging features, including four longitudinally-extending ribs 232 as well as fore and aft transverse ribs 236, 240. The longitudinally-extending ribs 232 extend between the fore and aft transverse ribs 236, 240 and are spaced apart from each other to define slots 244 therebetween. As shown in FIG. 23, the longitudinally-extending ribs 232 are substantially, although not exactly, parallel with each other along the longitudinal direction (i.e., in the direction of travel) of the motorcycle 200. The function of the various ribs 232, 236, 240 as engaging features is explained in further detail below.

Figure 21:
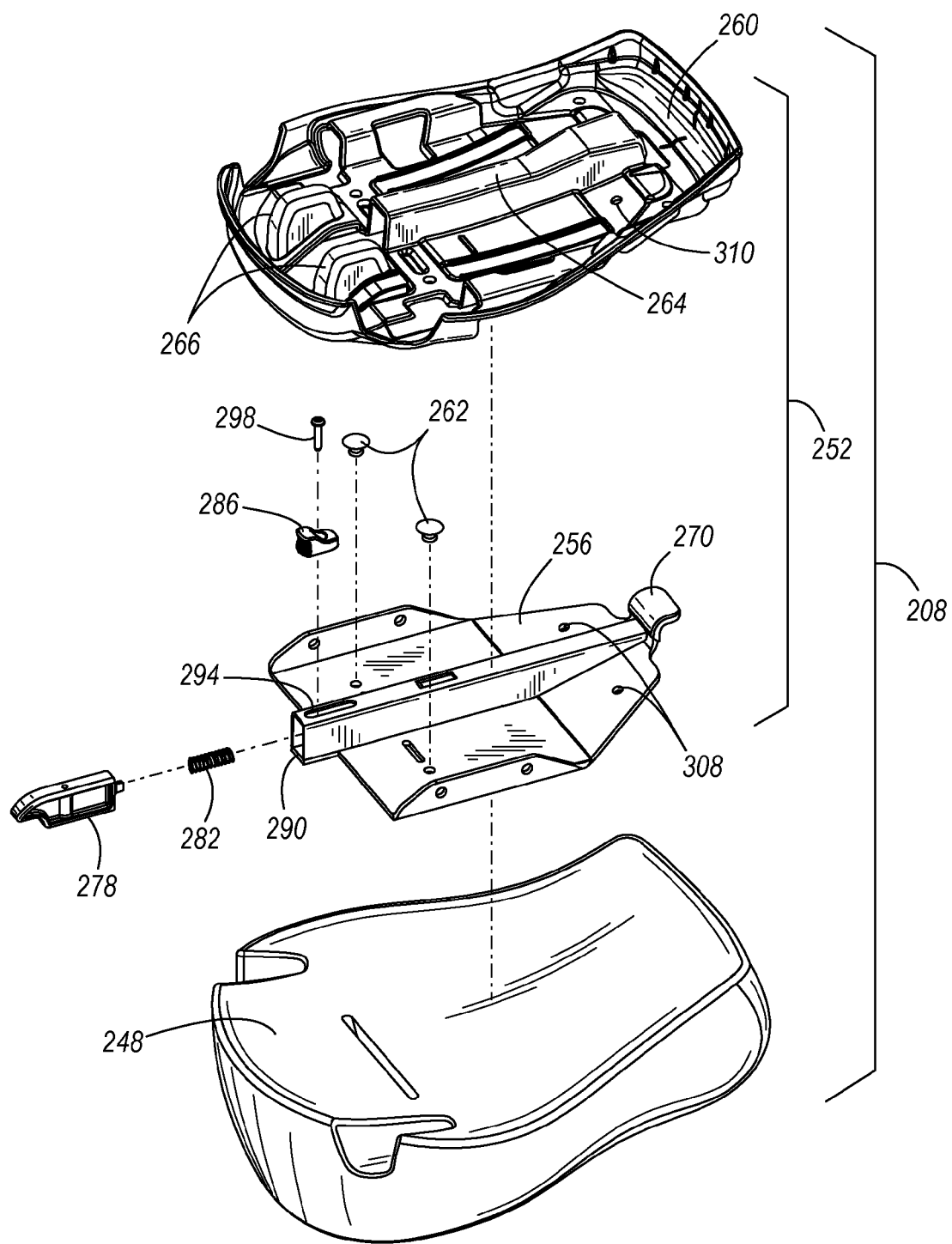
FIG. 21 is an exploded assembly view of the passenger seat assembly of FIG. 19.

As shown in FIGS. 19 and 21, the passenger seat assembly 208 includes a cushion portion 248 to provide a comfortable seating surface for a passenger of the motorcycle 200. The cushion portion 248 is removed from the views of FIGS. 20 and 22A-23 for clarity to illustrate various features of the passenger seat assembly 208. The passenger seat assembly 208 is coupled to the motorcycle 200 by attachment directly to the luggage rack assembly 204, as described in further detail below. The passenger seat assembly 208 includes a seat pan assembly 252 (FIGS. 20-23) including a first member 256 such as a plate or stamping and a second member 260 such as a formed plastic member that is coupled to the first member 256. The first and second members 256, 260 are coupled by a pair of fasteners 262 (e.g., rivets) as shown in FIGS. 20-22B. The seat pan assembly 252 is configured to enable the addition of an optional passenger backrest 263 (FIG. 20) similar to the upper portion 76 of the passenger seat assembly 68 as shown in FIGS. 2 and 11.

As shown in FIGS. 20-23, the seat pan assembly 252 includes a plurality of contours or bosses 264, 266 that are shaped to conform to the support member 220 and fit within the slots 244 thereof. Specifically, the central boss 264 is configured to engage the central slot 244, and the offset bosses 266 are configured to engage the slots 244 to the immediate left and immediate right of the central slot 244. When the passenger seat assembly 208 is placed on the luggage rack assembly 204, the bosses 264, 266 restrict or prevent movement of the passenger seat assembly 208 relative to the luggage rack assembly 204 in the fore and aft directions as well as side-to-side.

Figure 22A:
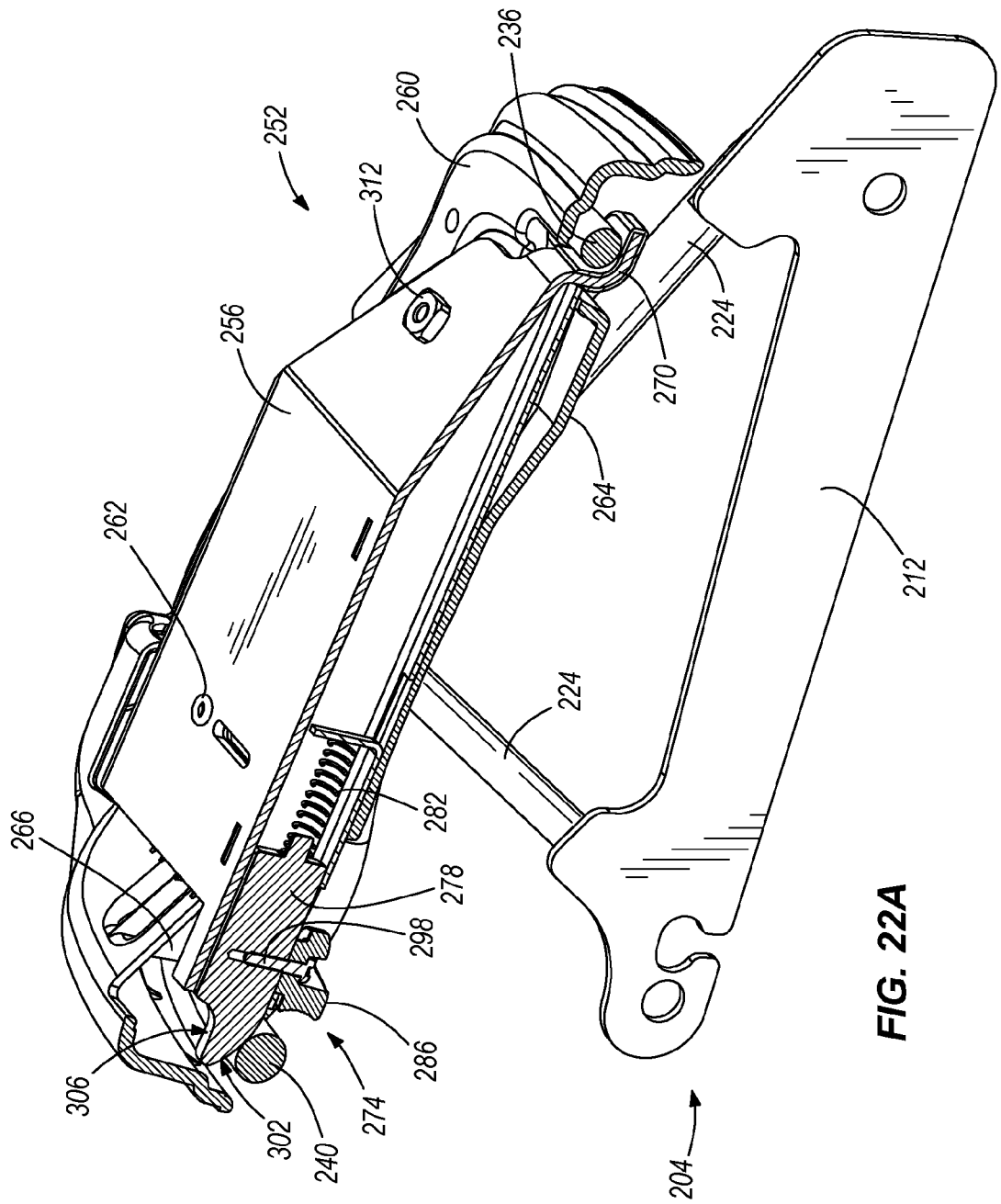
FIG. 22A is a cross-sectional view of the passenger seat assembly, taken through line 22-22 of FIG. 19. The cushion portion of the passenger seat assembly is removed, and a movable mounting member is in an unlocked position.

The passenger seat assembly 208 further includes a mounting member in the form of a centrally-located, flat hooked portion 270. The hooked portion 270 is substantially fixed relative to the seat pan assembly 252 and is configured to engage the forward transverse rib 236 as shown in FIGS. 22A-23. The hooked portion 270 is inserted underneath the forward transverse rib 236 with the rearward portion of the passenger seat assembly 208 tilted upward away from the luggage rack assembly 204. When the hooked portion 270 is engaged with the forward transverse rib 236 and the passenger seat assembly 208 is lowered onto the support member 220, the passenger seat assembly 208 has one degree of freedom relative to the luggage rack assembly 204. In this condition, the passenger seat assembly 208 can rotate about the hooked portion 270.

Figure 22B:
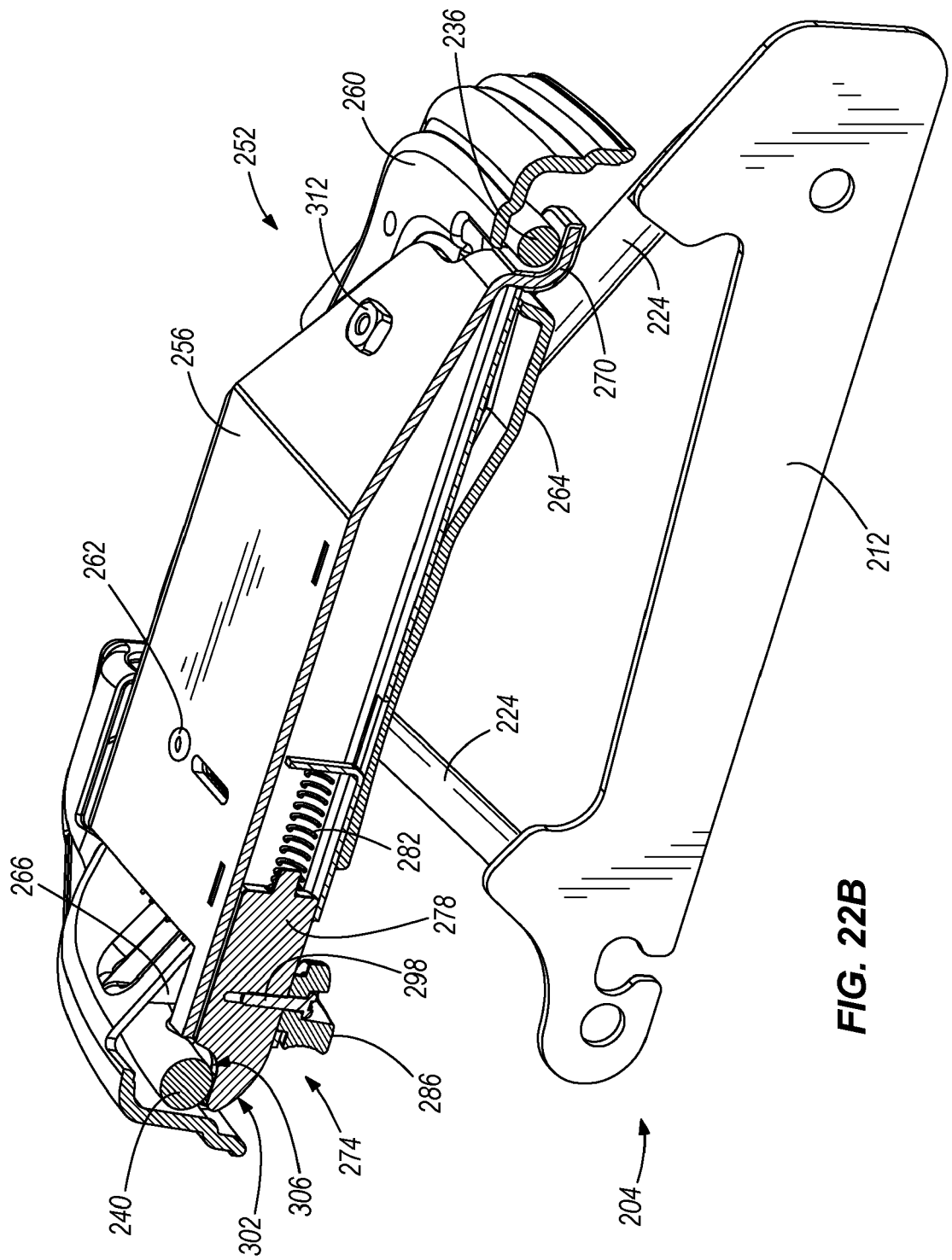
FIG. 22B is a cross-sectional view of the passenger seat assembly, taken through line 22-22 of FIG. 19. The cushion portion of the passenger seat assembly is removed, and a movable mounting member is in a locked position.

The passenger seat assembly 208, and more particularly, the seat pan assembly 252 further includes a movable mounting member in the form of a latch 274 (FIGS. 20-23) configured to engage the luggage rack assembly 204 as described below. The latch 274 includes a latching member 278, a coil spring 282, and an actuator 286. The latching member 278 and the coil spring 282 are inserted into an opening 290 (FIG. 21) in the first member 256 of the seat pan assembly 252. The actuator 286 extends through or is coupled to the latching member 278 through a slot 294 adjacent the opening 290 in the first member 256. The actuator 286 is secured to the latching member 278 with a screw 298 (FIG. 21). The coil spring 282 biases the latching member 278 out of the opening 290 (to the left in FIGS. 22A and 22B). The actuator 286 contacts the slot 294 and retains the latching member 278 within the opening 290. The latch 274 is movable between an unlocked position (FIG. 22A) and a locked position (FIG. 22B).

The latching member 278 includes a first, generally convex surface 302 and a second, generally concave surface 306. The first surface 302 is configured to face the rearward transverse rib 240 prior to engagement of the latching member 278 with the support member 220. The shape of the first surface 302 aides in moving the latch 274 toward the unlocked position when the passenger seat assembly 208 is pressed down onto the luggage rack assembly 204. The latching member 278 may be retracted to allow engagement between the rearward transverse rib 240 and the second surface 306 by contact with the transverse rib 240 or by deliberate retraction by a user with the actuator 286. FIG. 22B illustrates the latch 274 in the locked position with the second surface 306 engaging the rearward transverse rib 240 to secure the passenger seat assembly 208 to the luggage rack assembly 204. The coil spring 282 biases the latch 274 to the locked position.

To remove the passenger seat assembly 208 from the motorcycle 200, a user operates the actuator 286 to move the latch 274 to the unlocked position. The passenger seat assembly 208 is then be rotated about the hooked portion 270 to lift the rearward portion of the passenger seat assembly 208 and the latch 274 away from the support member 220. The hooked portion 270 is then disengaged from the forward transverse rib 236, and the passenger seat assembly 208 is free from the luggage rack assembly 204. The passenger seat assembly 208 may be provided with a strap similar to the strap 102 shown in FIGS. 2 and 11, which may be grasped during attachment and/or detachment of the passenger seat assembly 208 and the luggage rack assembly 204. Mounting holes 308, 310 in the respective first and second members 256, 260 of the seat pan assembly 252 are provided for attaching such a strap. Nuts 312 (FIGS. 22A and 22B) may also be provided for retaining threaded fasteners (not shown) at each end of such a strap. Alternately, fasteners may engage either or both of the first and second members 256, 260 of the seat pan assembly 252 to attach such a strap.

Foam strips (not shown) may be coupled to a lower surface of the seat pan assembly 252 (e.g., a surface of the second member 260 facing the support member 220) and configured to contact the support member 220 when the passenger seat assembly 208 is coupled to the luggage rack assembly 204. The foam strips can extend longitudinally along the ribs 232 and/or transversely along the ribs 236, 240 between the second member 260 and the support member 220. The foam strips are positioned and compressed between the support member 220 and the seat pan assembly 252 to protect the surface finish (e.g., paint, chrome, etc.) on the support member 220 and to preload the latch 274 when engaged with the rearward transverse rib 240 to prevent rattling. The foam strips may be provided as foam tape or foam blocks, among other resilient materials. Foam strips may be similarly employed on the seat pan assembly 80 of the passenger seat assembly 68 shown in FIGS. 2 and 5-11 and the passenger seat assembly 136 of FIG. 12.

Thus, the invention provides, among other things, a passenger seat assembly selectively attachable to a luggage rack assembly.

What is claimed is:

1. A luggage rack and passenger seat combination for a motorcycle comprising:

a luggage rack assembly configured to mount to the motorcycle, the luggage rack assembly having a support member operable to support cargo on a support surface thereof, the luggage rack assembly including a first engaging feature and a second engaging feature; and a passenger seat assembly including a movable mounting member and a fixed mounting member, wherein the movable mounting member is movable between an unlocked position and a locked position, wherein the movable mounting member is extendable through the support member to engage with the first engaging feature at an underside of the support member, wherein the movable mounting member is movable about an axis, wherein the axis is fixed relative to the passenger seat assembly, and wherein the fixed mounting member is engageable with the second engaging feature to removably couple the passenger seat assembly to the luggage rack assembly to support a passenger of the motorcycle.

2. The luggage rack and passenger seat combination of claim 1, wherein the luggage rack assembly is convertible without the use of tools between a cargo configuration in which the passenger seat assembly is removed from the luggage rack assembly and a passenger seat supporting configuration in which the passenger seat assembly is fastened to the luggage rack assembly.

3. The luggage rack and passenger seat combination of claim 1, wherein the second engaging feature is on a surface opposite the support surface, the fixed mounting member extending through the support member from above and engaging the second engaging feature.

4. The luggage rack and passenger seat combination of claim 3, wherein the fixed mounting member includes a hooked portion.

5. The luggage rack and passenger seat combination of claim 1, wherein the movable mounting member includes one of a rotatable clasp and a latch member.

6. The luggage rack and passenger seat combination of claim 5, wherein the passenger seat assembly is rotatable relative to the luggage rack assembly about the second engaging feature when the movable mounting member is in the unlocked position.

7. The luggage rack and passenger seat combination of claim 5, wherein the movable mounting member is biased to the locked position.

8. The luggage rack and passenger seat combination of claim 5, wherein the movable mounting member includes a clasp rotatable about the axis, and wherein the axis is substantially perpendicular to a bottom surface of the passenger seat assembly, the clasp being rotatable not more than about 90 degrees to move the clasp between the locked position and the unlocked position.

9. The luggage rack and passenger seat combination of claim 8, wherein the clasp has a variable interference fit with first and second portions of the support member that are adjacent the opening, the variable interference fit having an increasing and then decreasing interference amount as the clasp is rotated from the unlocked position to the locked position and as the clasp is rotated from the locked position to the unlocked position.

10. A luggage rack and passenger seat combination for a motorcycle comprising:
    a luggage rack assembly configured to mount to the motorcycle, the luggage rack assembly having a support member operable to support cargo on a support surface thereof, the support member including an engaging feature;
    a passenger seat assembly removably mountable to the luggage rack assembly to support a passenger of the motorcycle, the passenger seat assembly including a bottom surface configured to face the support member when the passenger seat assembly is coupled to the luggage rack assembly; and
    a movable mounting member extending from the bottom surface of the passenger seat assembly and rotatable about an axis substantially perpendicular thereto between an unlocked position and a locked position, the movable mounting member being configured to extend through the support member and engage with the engaging feature at an underside of the support member to restrain the passenger seat assembly from moving relative to the luggage rack assembly when in the locked position.

11. The luggage rack and passenger seat combination of claim 10, wherein the luggage rack assembly is convertible without the use of tools between a cargo configuration in which the passenger seat assembly is removed from the luggage rack assembly and a passenger seat supporting configuration in which the passenger seat assembly is fastened to the luggage rack assembly.

12. The luggage rack and passenger seat combination of claim 10, wherein the support member includes a second engaging feature and the passenger seat assembly includes a fixed mounting member configured to extend through the support member and removably engage the second engaging feature of the support member to limit the allowable movement of the passenger seat assembly relative to the luggage rack assembly.

13. The luggage rack and passenger seat combination of claim 12, wherein the fixed mounting member includes a rod having a hooked end.

14. The luggage rack and passenger seat combination of claim 10, wherein the movable mounting member includes a clasp rotatable not more than about 90 degrees between the locked and unlocked positions.

15. The luggage rack and passenger seat combination of claim 14, wherein the clasp has a variable interference fit with one or more portions of the support member adjacent the engaging feature, the variable interference fit having an increasing and then decreasing interference amount as the clasp is rotated from the unlocked position to the locked position and as the clasp is rotated from the locked position to the unlocked position.

16. A method of securing a passenger seat assembly having a movable mounting member to a support member of a luggage rack assembly on a motorcycle, the method comprising:
    inserting a fixed mounting member of the passenger seat assembly through the support member and into a receiving feature of the support member;
    providing the passenger seat assembly with a single degree of freedom, which is rotational, relative to the luggage rack assembly when the fixed mounting member is inserted into the receiving feature;
    inserting the movable mounting member in an unlocked position into an opening in the support member and through the support member to an underside thereof;
    rotating the movable mounting member from the unlocked position to a locked position, in which the movable mounting member is restrained against the support member to secure the passenger seat assembly to the luggage rack assembly; and
    providing the passenger seat assembly with zero degrees of freedom relative to the luggage rack assembly when the movable mounting member is in the locked position and the fixed mounting member is inserted into the receiving feature.

17. The method of claim 16, wherein rotating the movable mounting member from the unlocked position to the locked position includes overcoming a maximum interference between the movable mounting member and the support member.

18. The method of claim 16, wherein rotating the movable mounting member from the unlocked position to the locked position includes rotating the movable mounting member not more than about 90 degrees.

19. A method of securing a passenger seat assembly having a movable mounting member to a substantially horizontal support member of a luggage rack assembly on a motorcycle, the method comprising:
    inserting a fixed mounting member of the passenger seat assembly through the support member and into a receiving feature of the support member;
    providing the passenger seat assembly with a single degree of freedom, which is rotational, relative to the luggage rack assembly when the fixed mounting member is inserted into the receiving feature;
    inserting the movable mounting member in an unlocked position into an opening in the support member;
    rotating the movable mounting member about a substantially vertical axis from the unlocked position to a locked position, in which the movable mounting member is restrained against the support member to secure the passenger seat assembly to the luggage rack assembly; and
    providing the passenger seat assembly with zero degrees of freedom relative to the luggage rack assembly when the movable mounting member is in the locked position and the fixed mounting member is inserted into the receiving feature.

* * * * *